US005129953A

United States Patent [19]

Suitch et al.

[11] Patent Number: 5,129,953

[45] Date of Patent: * Jul. 14, 1992

[54] METHOD FOR IMPROVING BULK DENSITY AND FLOWABILITY OF CALCINED KAOLIN CLAY PRODUCTS

[75] Inventors: Paul R. Suitch; Dursun E. Ince, both of Milledgeville; Hilary Burgamy, Sandersville, A. Taylor Coppage, Macon; Tony May, Sandersville, all of Ga.

[73] Assignee: E.C.C. America, Inc., Atlanta, Ga.

[*] Notice: The portion of the term of this patent subsequent to Jul. 2, 2008 has been disclaimed.

[21] Appl. No.: 752,094

[22] Filed: Aug. 29, 1991

Related U.S. Application Data

[62] Division of Ser. No. 499,034, Mar. 26, 1990, Pat. No. 5,074,475.

[51] Int. Cl.$^5$ .................. C04B 14/20; C04B 14/04; C09C 1/02

[52] U.S. Cl. .................. 106/416; 106/464; 106/468; 106/486; 106/484; 501/141; 501/144; 501/150; 241/23; 241/30; 241/184

[58] Field of Search ............... 106/416, 464, 468, 486, 106/484; 241/23, 24, 30, 19, 29, 184; 501/141, 144, 150

[56] References Cited

U.S. PATENT DOCUMENTS 5,028,268 7/1991 Ince et al. ..................... 106/416

Primary Examiner—William R. Dixon, Jr.
Assistant Examiner—Michael Marcheschi
Attorney, Agent, or Firm—Klauber & Jackson

[57] ABSTRACT

The bulk handling characteristics of a calcined kaolin clay powder, including the bulk density and flowability, are significantly improved by forming an aqueous slurry of the calcined kaolin clay powder and spray drying the slurry.

2 Claims, 4 Drawing Sheets

200UM

1UM

2UM

2UM

METHOD FOR IMPROVING BULK DENSITY AND FLOWABILITY OF CALCINED KAOLIN CLAY PRODUCTS

CROSS-REFERENCE TO RELATED APPLICATIONS

This application is a division of U.S. application Ser. No. 499,034, filed on Mar. 26, 1990, now U.S. Pat. No. 5,074,475, and co-pending herewith, priority of which is claimed hereunder.

FIELD OF THE INVENTION

This invention relates generally to calcined clay products, and more specifically relates to a method for treating a substantially anhydrous white kaolin clay powder so as to improve the bulk handling characteristics of the same when the product is loaded, unloaded and shipped.

BACKGROUND OF THE INVENTION

In the course of manufacturing paper and similar products, including paper board and the like, it is well known to incorporate quantities of inorganic materials into the fibrous web in order to improve the quality of the resulting product. A number of inorganic materials have long been known to be effective for these purposes, such as titanium dioxide, which can be incorporated into the paper in the form of anatase or rutile. Titanium dioxide, however, is among the most expensive materials which are so usable. Accordingly, in recent years, considerable efforts have been made to develop satisfactory replacements for the said titanium dioxide.

Among the materials which have thus found increasing acceptance as paper fillers are substantially anhydrous kaolin clays. Materials of this type are generally prepared by partially or fully calcining a crude kaolin clay, which may have been initially subjected to prior beneficiation steps in order to remove certain impurities, e.g. for the purpose of improving brightness in the ultimate product. It is important for an understanding of the present invention, to recognize that those skilled in the art of kaolin processing draw a sharp and fundamental distinction between uncalcined and calcined kaolins. With respect to terminology, it is noted that the prior art literature, including numerous of the prior art patents relating to the field of kaolin products and processing, often uses the term "hydrous" to refer to a kaolin which has not been subjected to calcination—more specifically, which has not been heated to temperatures above about 450° C., which temperatures serve to alter the basic crystal structure of kaolin. These so-called "hydrous" clays may have been produced from crude kaolins, which have been subjected to beneficiation, as, for example, to froth flotation, to magnetic separation, to mechanical delamination, grinding, or similar comminution, but not to the mentioned heating as would impair the crystal structure.

In an accurate technical sense, the description of these materials as "hydrous" is, however, incorrect. More specifically, there is no molecular water actually present in the kaolinite structure. Thus, although the composition can be (and often is) arbitrarily written in the form $2H_2O \cdot Al_2O_3 \cdot 2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period which eliminates the hydroxyl groups, the crystalline structure of the kaolinite is destroyed. As used in this specification, the term "calcined kaolin" shall refer to such a kaolin. Preferably the calcined kaolin has been heated above the 980° C. exotherm, and therefore is "fully calcined", as opposed to having been rendered merely a "metakaolin". Reference may be had in the foregoing connection to *Proctor*, U.S. Pat. Nos. 3,014,836 and to *Fanselow et al*, 3,586,823, which disclosures are representative of portions of the prior art pertinent to fully calcined kaolins.

A calcined product having characteristics generally superior to previously available such calcined kaolin pigments, is the ALPHATEX® product of E.C.C. America Inc., assignee of the present application. This product again is a substantially anhydrous white kaolin clay pigment, which has unusual efficacy as a filler in paper sheets and similar paper products. The pigment also has application as a coating pigment for paper, and as a pigment in paints and other filled systems. It generally consists of aggregates of anhydrous kaolin clay particles, and exhibits exceptionally high light-scatter and opacifying characteristics when incorporated as a filler in paper.

ALPHATEX® is further described in U.S. Pat. No. 4,381,948 to A. D. McConnell et al, as being an anhydrous white kaolin clay pigment having high light scattering when incorporated as a filler in paper, the pigment consisting of porous aggregates from sub-micron sized kaolin clay platelets obtained by classification of a dispersed kaolin clay to a 100% less than one micron ESD fraction, the aggregates having an average specific gravity in the range of 0.5 to 0.6 and a mean internal pore size of less than 0.55 microns. The size distribution of the aggregates is such that no more than 5% by weight thereof are greater than 10 microns ESD, at least 75% are of less than 2 microns ESD, and not more than 15% by weight are of less than 1 micron ESD. The pigment has a Valley abrasion value below 30 mg., and a G.E. brightness of at least 93.

Calcined kaolin clay products such as AL-PHATEX® are normally pulverized and then air-classified after calcination for the purpose of removing +325 mesh residue (to conform to specification for intended use in paper), or in order to remove larger abrasive particles. Such products are then sold by the manufacturer as a finely pulverized low-bulk density powder, which powder, because of flow characteristics, is often difficult to handle by conventional bulk handling systems. Because of the difficulties in handling such products, they are typically shipped in bulk in "sparger cars". These are bulk-hopper railroad cars fitted with special valves at the bottom which allow water to be injected into the car upon arrival at the customer's facility. Air is then injected into the car to agitate the water and powdered clay mixture. As soon as possible after the injection of the water and air, the fluid suspension is pumped from the car at about 30%–35% solids into a storage tank.

Because of the low-bulk density of the clay powders, typically only 35 to 40 tons of clay can be loaded into a 4,700/ft³ rail car. The bulk density of this material would normally be measured in the laboratory to be about 10 to 12 lbs/ft³; this material would pack to about 15 to 17 lbs/ft³ in a fully loaded railroad car.

It has been disclosed in Bilimoria et al, U.S. Pat. No. 4,693,427 that the bulk density of calcined kaolin clay may be increased by dry milling the calcined and ground clay under specified conditions and in a specified way.

According to Cook et al, U.S. Pat. No. 4,561,597, bulk densities are increased by dry ball milling clay powder followed by pulverizing in a high-energy impact mill.

In procedures such as these, bulk densities have been significantly increased, but still remain below 25 lbs/ft$^3$. Furthermore, the flowability characteristics of the dry powder still remain relatively poor.

OBJECTS OF THE INVENTION

In accordance with the foregoing, it may be regarded as an object of the present invention, to provide a method for processing a calcined kaolin clay, which acts to markedly increase the bulk density of same and which provides as well, very significant improvements in the flow characteristics thereof.

It is another object of the invention to provide a calcined kaolin clay powder of increased bulk density and superior flow characteristics, thereby facilitating the handling, shipping, and ease of use of such product.

SUMMARY OF THE INVENTION

In accordance with the present invention, the bulk density and flowability of a calcined, pulverized and optionally milled kaolin clay is increased by forming an aqueous slurry of such clay, and thereafter spray drying the slurry to provide the improved product.

It is a feature of the invention that bulk densities of the order of 35 lbs/ft$^3$ and above can be readily attained, the flowability of the calcined kaolin clay is materially increased and the angle of repose is significantly decreased. This increase in bulk density and flowability greatly facilitates the shipment of calcined clay in dry bulk forms.

It is appreciated that spray drying has been heretofore employed in the processing of slurries of hydrous, i.e. uncalcined kaolins, including in the course of processing uncalcined kaolins to prepare a feed for subsequent calcination. In Fanselow, U.S. Pat. No. 3,372,043, for example, a spray dried clay product is produced by spray drying a beneficiated hydrous kaolin in the presence of a small amount of an added colloidal attapulgite clay. With respect to preparation of a calciner feed clay, Fanselow et al U.S. Pat. No. 3,586,523 is of interest in describing a process in which the starting material, a fine particle-sized kaolin crude is crushed, dispersed in water, degritted, classified to remove nearly all particles larger than about 2 microns ESD (equivalent spherical diameter), and chemically bleached with or without flotation beneficiation. Specifically, the filter cake from bleaching containing about 60% solids, is fluidized by adding a small amount of ammonium hydroxide. The dispersed slip is then spray dried and pulverized to provide a feed stock. This feed is then calcined, followed by pulverization. This patent therefore describes some basic operations in the production of calcined kaolin pigments, but nothing is disclosed about spray drying the final calcined product.

This is also true of the above-mentioned McConnell et al, U.S. Pat. No. 4,381,948, which describes the preparation of a kaolin clay pigment consisting of high light scattering porous aggregates of kaolin clay platelets, having certain properties of specific gravity, porosity and size distribution. The method of preparation typically comprises forming an aqueous dispersion of the crude clay at e.g. 60% solids, diluting with water to 15% solids, degritting, and subjecting to a particle size separation by centrifuging. From such separation a kaolin slurry of clay is recovered in which substantially all particles are less than 1 micron ESD. The slurry is dried by spray drying, pulverized, calcined under controlled temperature conditions, and again pulverized. Again, nothing is disclosed about spray drying the calcined product.

Cummings et al, U.S. Pat. No. 4,717,559, also shows the spray drying of a kaolin clay slurry in the course of its being prepared for calcining.

The discovery and use of spray drying of previously calcined kaolin clay to bring about surprising improvements in its bulk density and in its flowability, however, are to these applicants' knowledge, heretofore unknown. The improvements are all the more unexpected and surprising, when it is appreciated that the present process involves a reslurrying and spray drying of a product that has already been extensively beneficiated and subjected to high temperature calcining and pulverization. As one aspect of the invention, and contrary to the teachings of the prior art, in a sense, one thus adds water to a product that has previously been extensively processed to remove structural water. Despite this, it is found that the resulting product of the present invention, fundamentally remains a calcined clay—it is not rendered a hydrous clay. The moisture content in the resulting bead-like structures formed by the spray drying is less than about 1.0% by weight, generally being from about 0.3 to 0.7%. When these beads are reslurried, it is found that the resultant particle size distribution (PSD) in the slurry is substantially the same as it was for the calcined kaolin powder prior to the spray drying. Hence, it appears that the PSD is not permanently altered by the spray drying; rather one apparently creates a bead which while combining the water and particulate calcined kaolin, does so in a simple mechanical form, which is readily disruptible upon reslurrying of the beads.

DETAILED DESCRIPTION OF THE PREFERRED EMBODIMENTS

Figure 1:
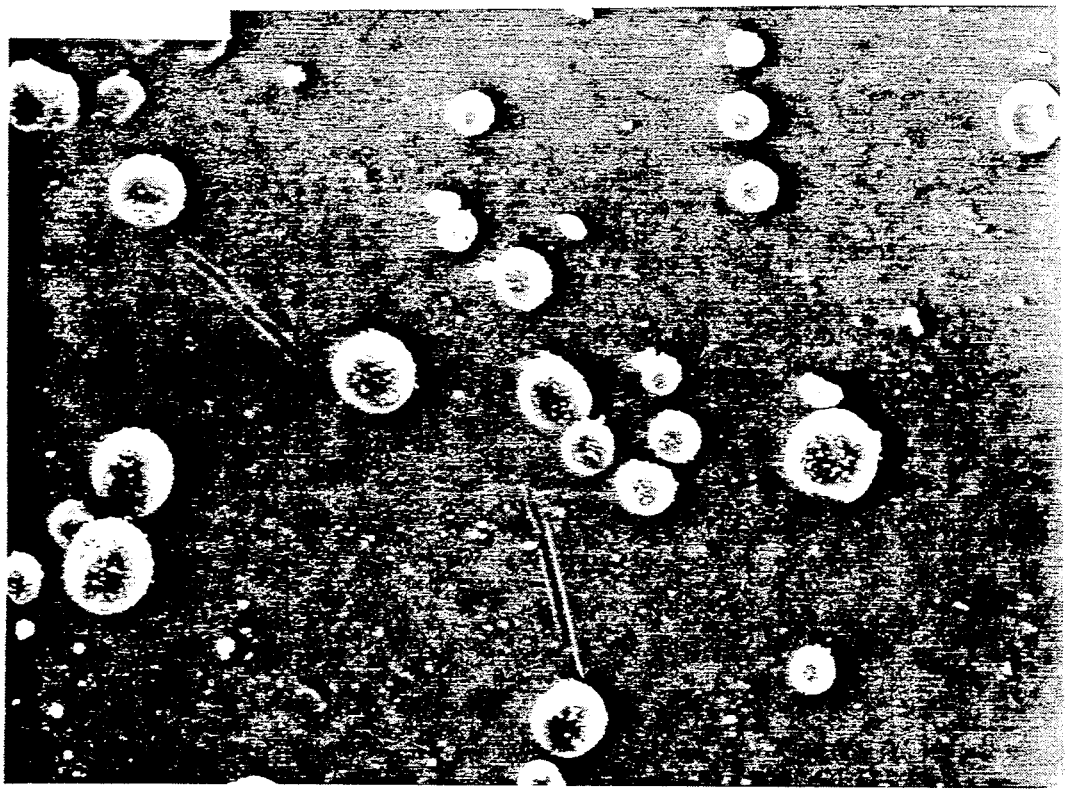
FIG. 1 is an electron photomicrograph of a spray dried product in accordance with the invention.

The calcined clay slurry to be spray dried in accordance with this invention is prepared by slurrying in water a calcined, powdered kaolin clay, as for example that described in U.S. Pat. No. 4,381,948, to provide a slurry of about 25%-50% solids content. The said McConnell et al U.S. Pat. No. 4,381,948 is incorporated herein by reference. The kaolin clay may have been pulverized as described in McConnell et al and could have been subjected to additional milling, including as described in U.S. Pat. Nos. 4,561,597 and 4,693,427. Similarly, other calcined kaolins can be treated by the invention, such as the products disclosed in the aforementioned Nos. 3,586,523, 3,014,836, 4,693,427, and 4,561,597. Preferably, a slurry with a solids content of at least about 35% is employed. Slurries with lower solids content, e.g. 25%, can be used but they have been found to lead to a lesser increase in bulk density. Slurries of greater solids content can be employed, but in some cases they tend to be more difficult to prepare.

The thus-prepared slurry is thereupon spray dried in conventional manner in conventional spray-drying apparatus. For example, the spray dryer may be of the cocurrent counter-current or mixed-flow type. Nozzles, discs or the like can be used to disperse the slurry into droplets. The temperature of the inlet and outlet air in the spray dryer will depend, of course, on the design of the dryer. The temperature should be such that the bulk of moisture is removed. A rotary disc spray dryer has been found to be particularly effective. In a typical procedure the slurry is cocurrent spray-dried in such a device using an air inlet temperature of 980 to 1100° F., and an air outlet temperature of 225 to 235° F.

In some instances, a small amount of a conventional binder or stabilizer can be added to the slurry, such as an alginate, e.g. 2 to 10 pounds per ton, based on the weight of the dry clay. Other like water soluble binders such as carboxy methylcellulose (CMC), hydroxy ethyl cellulose, polyvinyl alcohol, polyvinyl pyrrolidone; bentonites; or combinations of such materials can be used. In other instances, a binder will not be used, because of possible residue problems caused by same. A small amount of a dispersing agent, such as a condensed phosphate, illustrated by tetra-sodium pyrophosphate, sodium hexametaphosphate and sodium tripolyphosphate, and like dispersants well known in the art, may also be incorporated into the slurry to be spray dried. Such dispersants are typically employed in the amount of .2 to 10 pounds per ton of dry clay.

Surprisingly and unexpectedly, the bulk density of the calcined kaolin clay subjected to the process of the invention is dramatically increased, its flowability is materially improved and its angle of repose is effectively decreased. When an angle of repose is high, the clay resists flow through chutes and hoppers so that vibrators and air lancers must be used, but when the angle of repose is low, the clay will flow readily in hoppers and chutes without the need for vibrators or lancers. Low flowability is directly related to a high angle of repose; a flowability value of 70 or above ensures free flow without the need for vibrating apparatus or the like. A lower value often presents the need for vibrating means.

Of particular significance, is the fact that the process of the invention does not affect the already favorable other properties of the calcined clay; and thus the characteristics of the calcined kaolin clay powder which render the same of such great value as a paper filler, are not impaired by the method of the invention, i.e. all of the desirable characteristics which are provided to the paper by the use of such material, such as increase in opacity, high light scattering, etc. remain substantially intact. As already mentioned, the bead-like product of the invention, when reslurried for use e.g. in paper compositions, yields a PSD substantially that which would be yielded by slurrying the kaolin clay powder without the treatment of the present invention.

The following specific Examples serve to illustrate the present invention. In the Examples, the bulk density measurement procedure is performed as follows: A prepared 100 ml cylinder is completely filled and tapped lightly until the level in the cylinder ceases to drop fairly rapidly. The level is then adjusted to 100 ml and container and clay are weighed. The bulk density quoted in lbs/ft$^3$ is then calculated as follows:

$$\frac{\text{wt. of clay (g)} \div 7.48 \text{ gals.} \times 3785 \text{ mls.} \times 1 \text{ lb.}}{454 \text{ g} \times 100 \text{ mls. clay} \times 1 \text{ ft}^3 \times 1 \text{ gal.}} = \text{lbs/ft}^3$$

Flowability is determined herein by the procedures described by ACF Industries of Houston, Tex. More specifically, flowability is determined from angle of repose, compressibility, angle of spatula and either uniformity coefficient or cohesion. Each of these four tests will provide maximum of 25 points. A material scoring 90 to 100 points will exhibit excellent flow characteristics, whereas a material scoring under 60 points will require vibration to obtain flow.

"Angle of repose" is the angle to horizontal assumed by a cone-like pile of material. The flatter the angle, the more flowable the material. Free flowing materials have an angle of repose in the range of 25 to 35°, whereas difficult to handle materials such as fine cohesive powders may have an angle of repose of 70° or more.

The "angle of spatula" is a measure of the angle of rupture (or internal friction). This is determined by inserting a spatula into the bottom of a pile of material and lifting straight up. The angle to the horizontal is measured several times and averaged. Except for very free-flowing materials, the angle of spatula is always higher than the angle of repose. For a material to be free flowing, its angle of spatula should be under 40°. As an example, sand has an angle of spatula of 25°, whereas flour has an angle of spatula of 80°.

The "uniformity coefficient" is an alternate flow property. It is used with granular materials and its alternate, cohesion is used with powders. It is determined from the screen analysis of the material. The more uniform a mass of particles in both size and shape, the more flowable it is likely to be. This coefficient is an indirect measure of size, shape and compressibility.

"Cohesion" is a property of a material is also determined from screen analysis. This test is a direct determination of the amount of energy necessary to pull apart aggregates of cohesive particles in a specified time. The more cohesive a material is, the poorer its flow properties.

EXAMPLE 1

A rotary disc spray drier was used to dry a 40% solids aqueous slurry of the calcined kaolin product ALPHATEX ®, to which 3 lbs/ton tetrasodium pyrophosphate as dispersant and 3 lb/ton of KELGIN ® (trademark of Kelco Inc., San Diego, Calif. for a sodium alginate) had been added as stabilizer. The ALPHATEX ® made into the slurry had a bulk density of 18 lbs/ft$^3$, a flowability of 57 and an angle of repose of 49°. The spray drier was run with an inlet temperature of 750° F., and an outlet temperature of 225° F.

After spray drying, the resultant product was composed of minute bead-like bodies having a 0.5% moisture content. The product was evaluated and it was found that its bulk density had been increased to 42 lbs/ft$^3$, its flowability had improved to 77, and its angle of repose had decreased to 35°, without affecting the other properties of the ALPHATEX ®. This is clearly shown in Table I below.

TABLE I

|  | ALPHATEX | SPRAY-DRIED ALPHATEX |
| --- | --- | --- |
| Bulk density (lbs/ft$^3$) | 18 | 42 |
| Flowability | 57 | 77 |
| Angle of Repose | 49° | 35° |

EXAMPLE 2

In like manner, another sample of the same ALPHATEX ® was made into a slurry of 50% solids content and was spray dried, as described in Example 1. The spray-dried product was comparable to that obtained in Example 1, also having a bulk density of 42 lbs/ft$^3$.

EXAMPLE 3

Another sample of the ALPHATEX ® of Example 1 was slurried and spray dried in a small NIRO ® laboratory spray drier. Procedures were as described in Example 1, except that the slurry had a solids content of 25%. The bulk density of the ALPHATEX ®, i.e. the calcined kaolin clay, which was initially 18, was increased to 26 lbs/ft$^3$. As previously indicated, slurries of lower solids content lead to lesser increases in bulk densities, but the bulk densities can still be increased to values higher than those generally obtained heretofore.

EXAMPLE 4

The procedure of Example 1 was followed except that o the ALPHATEX ® slurry spray dried included 50% solids. The spray dried product was found to include beads in the general size range of −10 mesh to 50 micrometers. This product was made down as a 50% solids slurry with the aid of 3 lbs/ton of TSPP as a dispersant. Particle size determinations were made on the made down product and compared with two 50% solids ALPHATEX ® slurries, with results as follows:

TABLE II

| Sample | Particle Size Distribution | | | |
| --- | --- | --- | --- | --- |
|  | −2 μm | −1 μm | −½ μm | −¼ μm |
| ALPHATEX ® Slurry 1 | 92 | 82 | 50 | 6 |
| ALPHATEX ® Slurry 2 | 92 | 84 | 46 | 10 |
| Spray dried beads of ALPHATEX ® after reslurrying | 92 | 86 | 50 | 8 |

It will be seen in Table II that the product of the invention, while being initially in the form of spray dried beads, upon being made down into an aqueous slurry, shows a PSD substantially as in the original dried calcined material when the latter is formed into an aqueous slurry.

The foregoing may be better appreciated by examination of the electron photomicrographs of FIGS. 1 through 4.

FIG. 1 is a 112X electron photomicrograph of a sample of a spray dried product of the type described in Example 1 herein. The individual highly spherical beads are clearly seen. This should be compared with FIG. 2, however, wherein a 31,700X magnification of the surface of one of the beads of FIG. 1 is seen. Here, large numbers of individual clay particles are seen, of very minute dimensions. The scales in each case are shown on the photographs.

Figure 2:
FIG. 2 is an electron photomicrograph of the surface of a bead in the FIG. 1 product.
Figure 3:
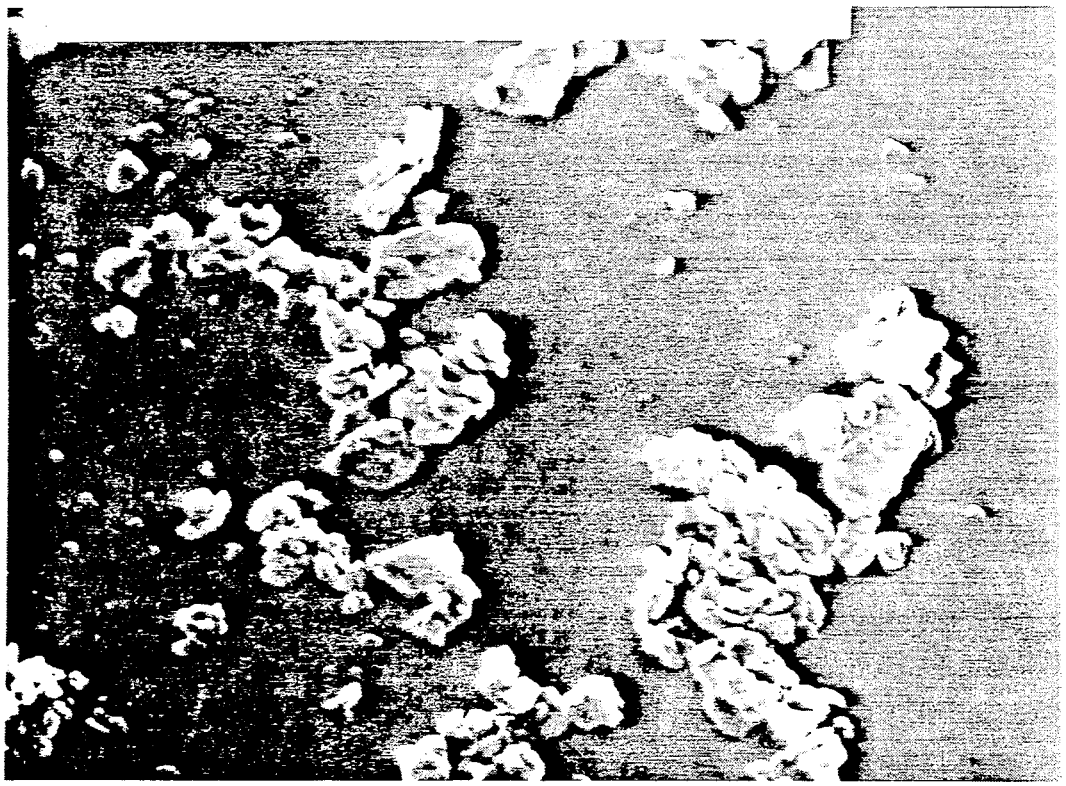
FIG. 3 is an electron photomicrograph showing the FIG. 1 product after same is slurried.
Figure 4:
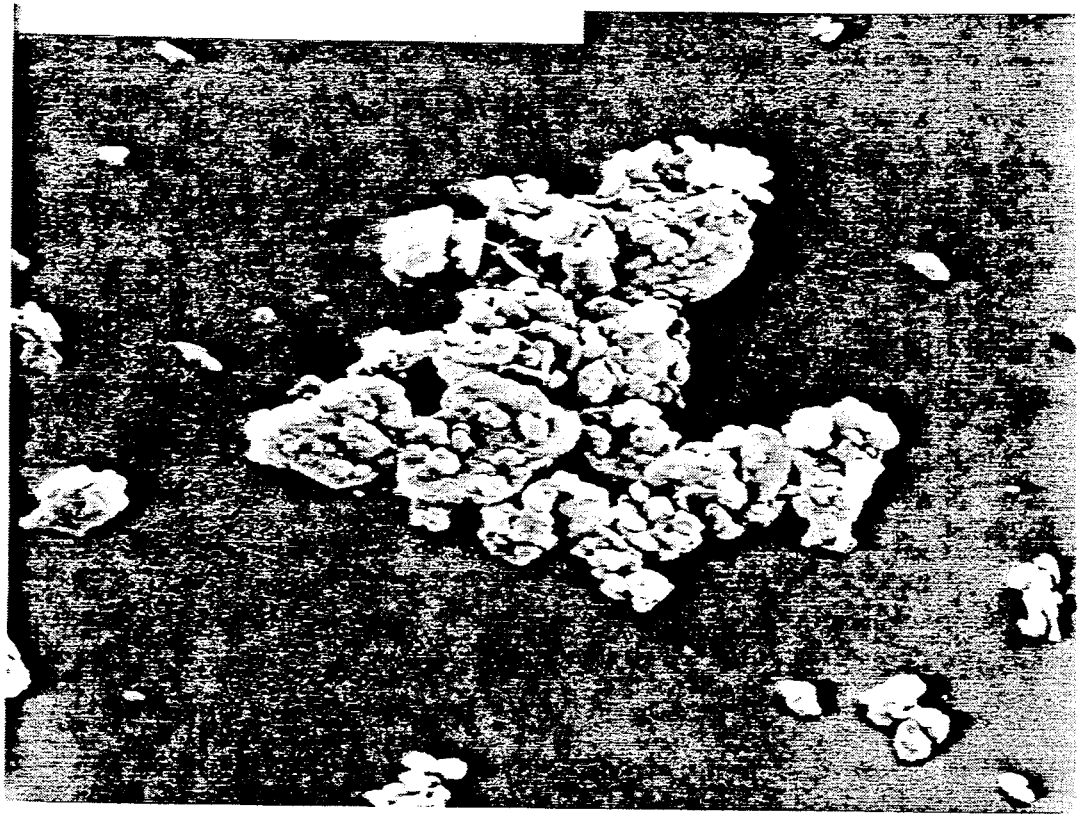
FIG. 4 is an electron photomicrograph of a sample of a commercial calcined clay product.

In FIG. 3, the product of FIG. 1 is shown subsequent to it being made down as described in the present Example 4. It is now seen that the individual clay particles present at the surface of the beads, as shown in FIG. 2, have been released. It is instructive to compare this with FIG. 4 showing at a 10,400X magnification the dispersed ALPHATEX ® from the calciner. The similarity in appearance between the showing of FIG. 3 and 4 will be evident. Thus it will be clear that the beaded structures of FIG. 1 provided in accordance with the invention, actually retain the individual minute kaolin particles in substantially the form in which same existed prior to the spray drying of the slurried powder, except that the individual minute kaolin particles are locked into the bead-like composites, to be released on reslurrying. The advantage of this is that the kaolin product, when in the spray-dried form, possesses such advantages as ease of handling, higher bulk density and the like in accordance with the invention; and yet when reslurried, the material has the same advantages otherwise known in the prior art—i.e. when used in papermaking processes.

EXAMPLE 5

In this Example, the spray dried product properties of an ALPHATEX ® slurry, with stabilizer, were compared with the characteristics of a product spray-dried from a slurry without the stabilizer. The stabilizer utilized was the Kelzan ® product of Kelco, Inc., which is a xanthum gum.

Specifically, an ALPHATEX ® slurry with 50% solids was prepared using 3 lbs/ton of Kelzan ®, and a similar slurry prepared with no Kelzan ®. Each of these products was spray dried using apparatus as in Example 1 and with an inlet temperature of 750° F. and an outlet temperature held at 225 to 250° F. The resulting products were compared and were found to be very similar within the limits of experimental error. The product in which the Kelzan ® was present yielded beads with 0.8% moisture and showed a bulk density of 36.1 lbs/ft$^3$. The size distribution of particles when this dried product was made down showed by weight 89%<2 microns; 79%<1; 45%<0.5; and 8% by weight <0.25 microns. In the case of the product produced without the Kelzan ®, moisture in the beads was 0.8% by weight. Bulk density was 39.7 lbs/ft$^3$. PSD was 88%<2; 78%<1; 41%<0.5; and 9%<0.25 microns. When tested for brightness using the conventional G.E. Scale and TAPPI procedure T6460s-75, the product with Kelzan ® yielded 90.1, and without 92.4. It will be evident that the product of the invention may be readily produced with or without the stabilizing binder and is equally effective.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A calcined kaolin product having high flowability and bulk density characteristics; said product being comprised of spray dried beads of an aqueous slurry of a calcined kaolin, the moisture content of said beads being in the range of 0.3 to 1%; and the bulk density of said product being at least 35 lbs/ft$^3$.

2. A product in accordance with claim 1, wherein said kaolin in said beads has been calcined at sufficient temperatures and for a sufficient period to destroy its crystalline structure.

* * * * *